United States Patent

Fetzer et al.

[15] 3,654,664

[45] Apr. 11, 1972

[54] MEAT TENDERIZER

[72] Inventors: Fred Fetzer, Strongsville; Ronald P. Miranda, Sandusky, both of Ohio

[73] Assignee: Bettcher Industries, Inc., Birmingham, Ohio

[22] Filed: Mar. 9, 1970

[21] Appl. No.: 17,668

[52] U.S. Cl. .................................................. 17/25
[51] Int. Cl. ............................................... A22c 9/00
[58] Field of Search ................................. 17/25, 28

[56] References Cited

UNITED STATES PATENTS

| | | | |
|---|---|---|---|
| 3,283,360 | 11/1966 | Tamain | 17/25 |
| 3,535,734 | 10/1970 | Ross | 17/25 |

FOREIGN PATENTS OR APPLICATIONS

| | | | |
|---|---|---|---|
| 1,198,470 | 6/1959 | France | 17/25 |

Primary Examiner—Lucie H. Laudenslager
Attorney—James F. Hoffman

[57] ABSTRACT

As a meat product travels intermittently along a horizontal conveyor belt by fixed increments, a plurality of downwardly directed blades carried by a vertically reciprocating ram carriage are moved from a position above the meat downwardly through the meat and then withdrawn upwardly. A stripper carriage associated with the ram carriage follows the latter during its downward stroke leaving a stripper frame resting on top of the meat. The stripper frame is locked in that position until the blades move upwardly out of the meat, at which time the stripper frame is unlocked and moved upwardly propelled by the ram carriage. Timing means causes said conveyor belt to move only when said blades are clear of said meat. Means is provided for varying the increment of conveyor belt travel while the machine is running.

8 Claims, 16 Drawing Figures

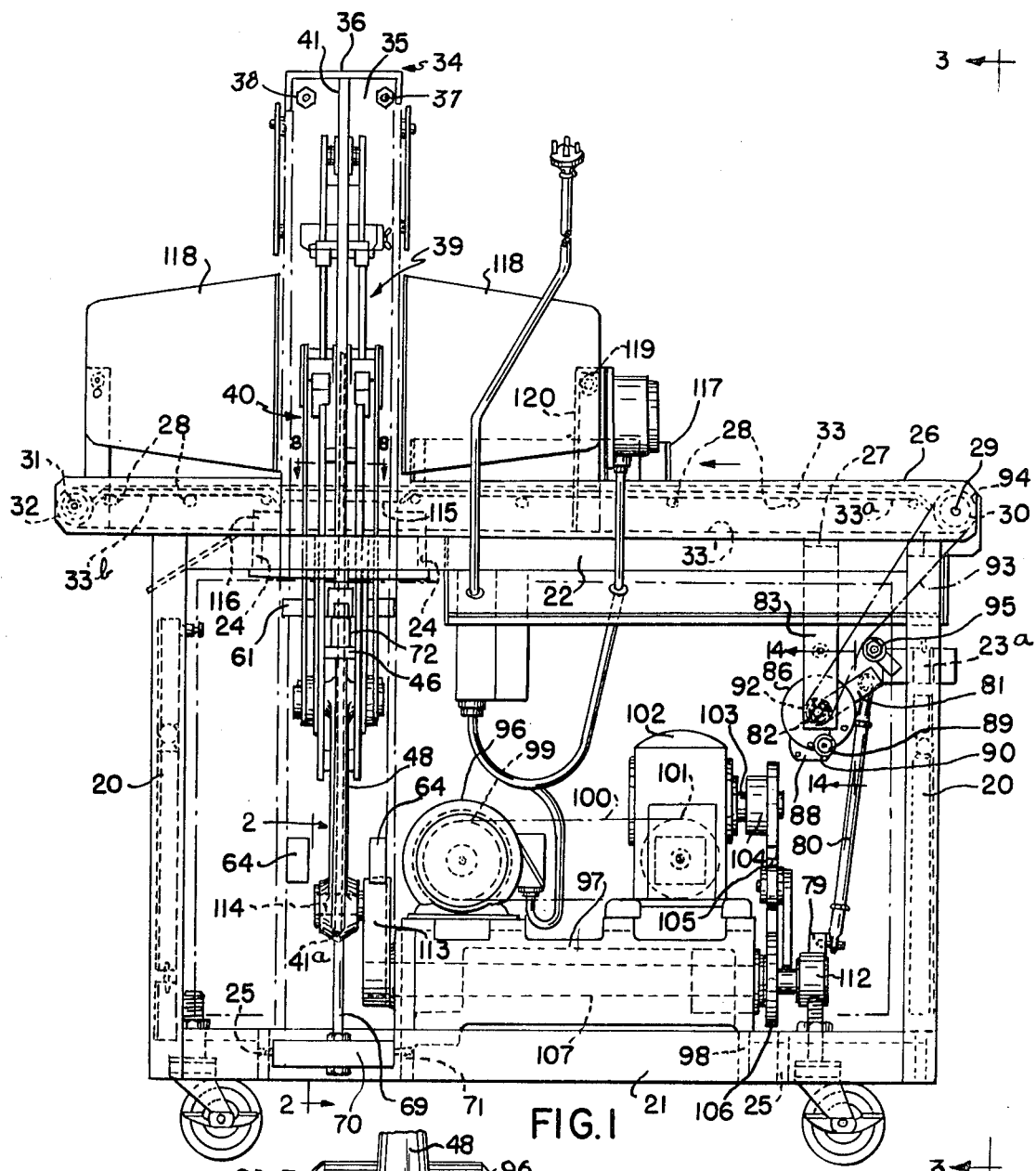

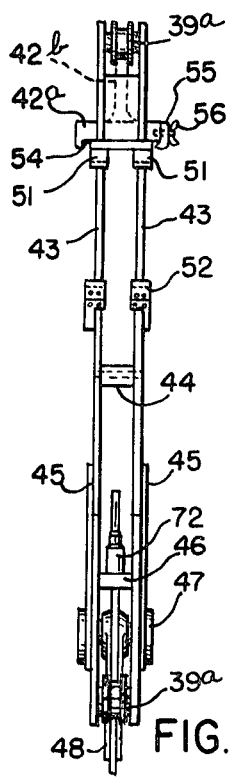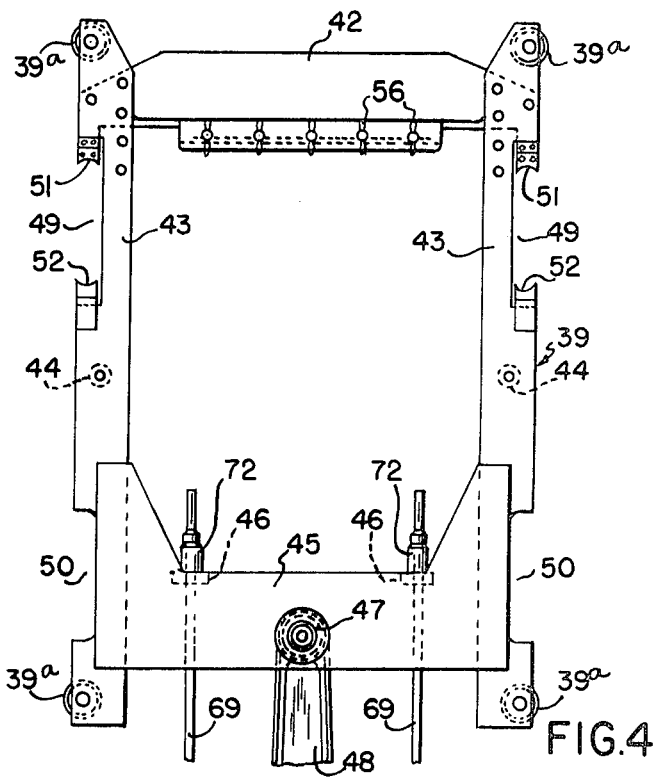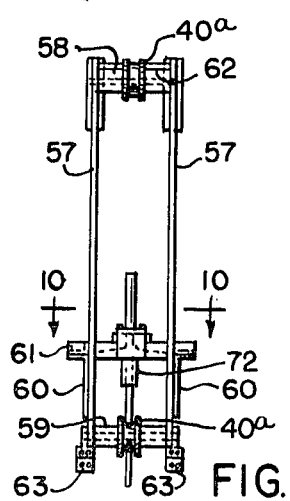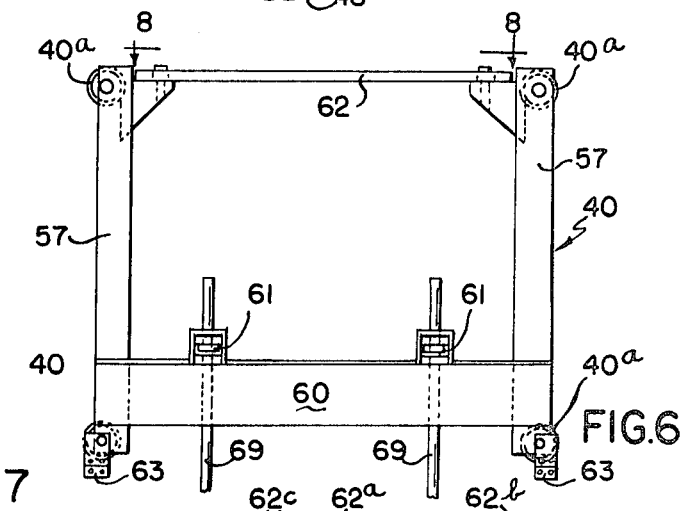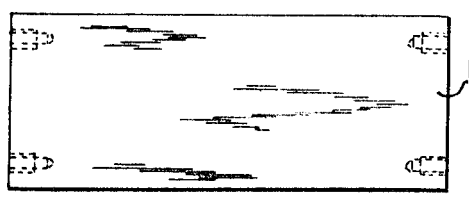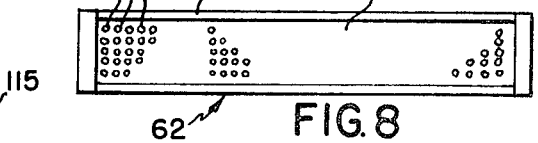

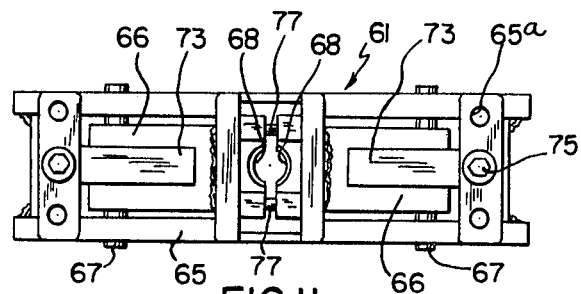
FIG.11
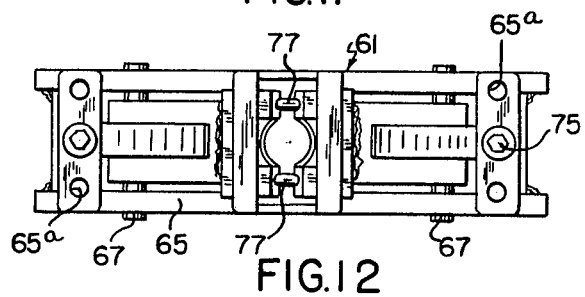
FIG.12
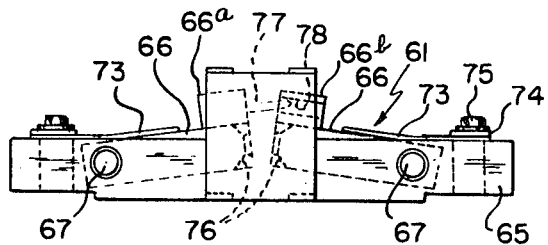
FIG.13
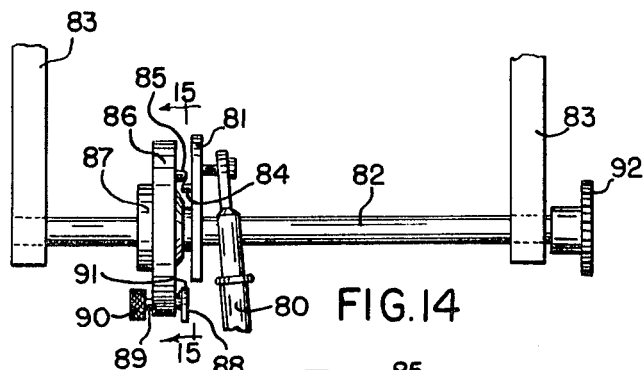
FIG.14
FIG.15
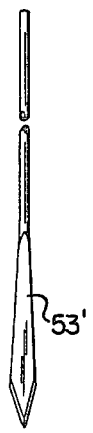
FIG.16
INVENTORS
FRED FETZER
RONALD MIRANDA
BY
*Baldwin, Egan, Walling & Fetzer*
ATTORNEYS

MEAT TENDERIZER

This invention relates to an improved apparatus for the tenderizing of chunks of meat. The meat is fed along an open mesh wire conveyor belt to a position beneath a ram carriage which reciprocates in a vertical direction. At the upper portion of the ram carriage is mounted a block of downwardly pointed knives which pierce the meat at each downward stroke of the ram carriage. A stripper carriage moves downwardly freely during the downward stroke of the ram carriage and is provided with a stripper frame which stops when it comes in contact with the upper surface of the meat. This stripper frame has openings through which the knives are free to pass downwardly into the meat. Locking pawls carried by the stripper carriage are locked relative to the frame of the machine before the ram starts to withdraw the tenderizing knives upwardly out of the meat. Thus, the stripper frame prevents the meat lifting from the conveyor while the knives are withdrawn. Upon the emergence of the knives upwardly out of the meat, the locking pawls are released and thereafter the stripper carriage moves upwardly with the ram carriage. Drive means is provided for advancing the conveyor by increments when the tenderizing knives are in an upper position withdrawn from the meat so as to advance a new portion of the meat to a location immediately beneath the tenderizing knives for the next stroke.

Objects of the invention include a strong and serviceable arrangement of the coacting parts for carrying out their functions, together with means for properly timing all of the operations of the apparatus and including means for varying the increment of advance of the conveyor while the machine is running if desired.

Other objects and advantages of this invention will be apparent from the accompanying drawings and description and the essential features thereof will be set forth in the appended claims.

In the drawings,

FIG. 1 is a side elevational view of the entire machine;

FIG. 2 is a transverse sectional view taken along the line 2—2 of FIG. 1;

FIGS. 4 and 5 are respectively front and side elevational views of the ram carriage removed from FIGS. 1 and 3;

FIGS. 6 and 7 are respectively front and side elevational views of the stripper carriage removed from FIGS. 1 and 3;

FIG. 8 is a top plan view of the stripper frame or plate taken from the position of the line 8—8 of FIG. 6;

FIGS. 9 and 10 are respectively top plan and side elevational views of the anvil beneath the conveyor belt where the tenderizing knives pierce the meat;

FIG. 11 is a top plan view, enlarged, of a stripper lock assembly;

FIG. 12 is a top plan view of the stripper lock assembly like FIG. 11 except with the locking pawls raised to the unlocking position;

FIG. 13 is a side elevational view of the locking pawl assembly of FIG. 12;

FIG. 14 is a fragmental view, enlarged, taken from the position of the line 14—14 of FIG. 1;

FIG. 15 is a fragmental view, enlarged, taken from the position of the line 15—15 of FIG. 14; while FIG. 16 is an elevational view of one of the tenderizing knives mounted in the ram carriage.

Figure 3:
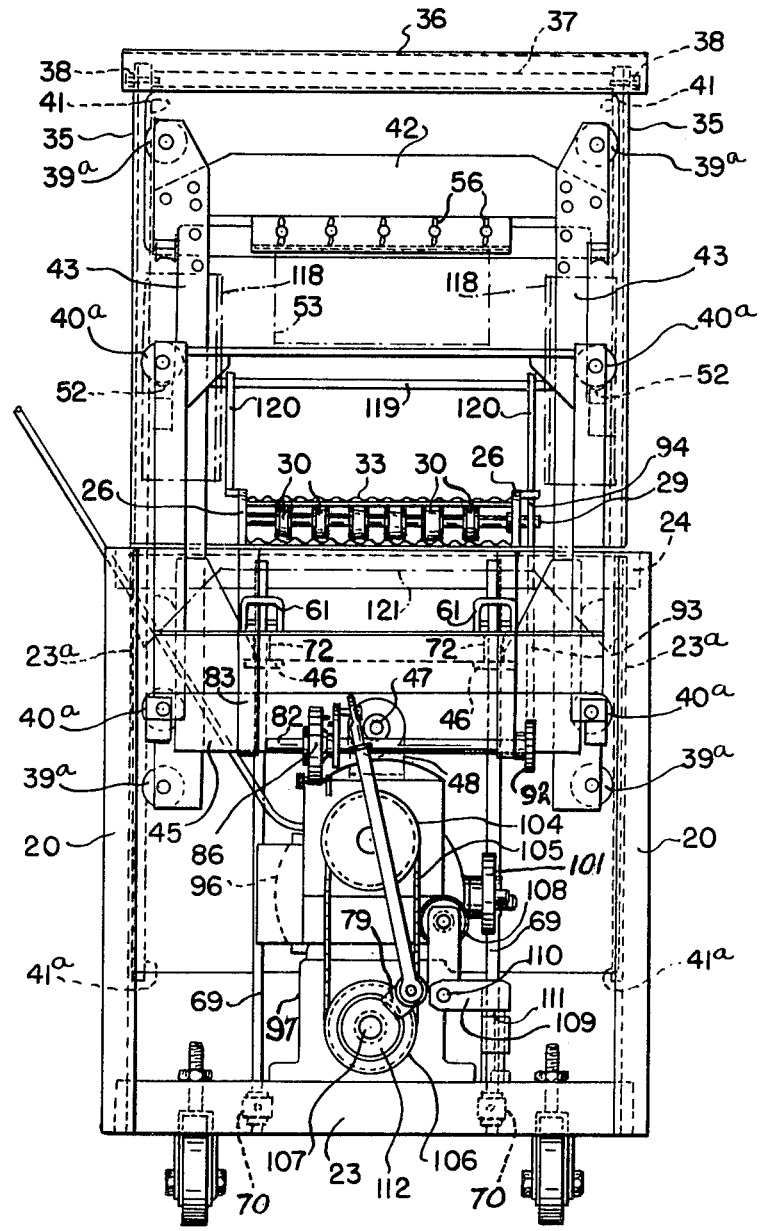
FIG. 3 is an end elevational view taken from the position of the line 3—3 at the right-hand end of FIG. 1 and with certain parts omitted or shown in dash-dot lines to clarify the description.

Referring now to FIGS. 1, 2 and 3, the main frame of the machine comprises four vertical corner posts 20, parallel bottom side frame members 21, parallel top side frame members 22, parallel bottom end members 23, top end member 23a, top spacer bars 24, bottom spacer bars 25, and sufficient bracing members to provide a substantially rigid framework.

The conveyor comprises two parallel side rails 26 supported by the top spacer bars 24 and a conveyor support member 27 which is part of the main frame. The side rails are also tied together by a plurality of cross bars 28. At the right-hand end of FIG. 1, a conveyor drive shaft 29 is rotatably mounted in the side rails 26. A drive sprocket 94 is fixed to the right-hand end of shaft 29 as viewed in FIG. 3. Also, a plurality of conveyor engaging sprockets 30 are secured to shaft 29 to rotate therewith. At the left-hand end of the conveyor, as seen in FIG. 1, an idler roll shaft 31 is rotatably mounted in the side rails 26 and carries a plurality of idler sprockets 32 aligned with the sprockets 30 at the opposite end. A conveyor belt 33 of a very open wire mesh has an upper working run adapted to travel in the direction of the arrow of FIG. 1 and having a return run at 33' traveling in the opposite direction. This conveyor belt passes over the sprockets 30 at one end and the sprockets 32 at the opposite end. A front conveyor belt support 33a and a rear support 33b are provided. Each of these is essentially a flat plate along which the wire mesh slides. The wire mesh of the conveyor belt is of an open mesh adapted to be engaged by sprockets 30 and 32.

Toward the left-hand side of FIG. 1, there is seen an upstanding framework 34 which supports the ram and stripper carriages. This framework consists essentially of two parallel upright channels 35 which are secured firmly to the main frame of the machine at their lower ends and which are secured together at the upper ends by means of a channel shape cap 36 and two channel tie bars 37 which pass through the upright channels 35 at opposite ends of the tie bars and are firmly held in position by nuts 38. The ram carriage 39 and the stripper carriage 40 are assembled within the framework 34 for reciprocation in a vertical direction. For clarity, the ram carriage is shown separately in FIGS. 4 and 5 and the stripper carriage is shown separately in FIGS. 6 and 7. As best seen in FIG. 1, the ram carriage is narrower lengthwise of the machine and fits inside the wider stripper carriage. The ram carriage has four rotatable guide wheels 39a rotatably mounted at the four corners of the carriage. The stripper carriage has four guide rollers 40a rotatably mounted at the four corners of that carriage. During the vertical reciprocation of the two carriages, all of the guide rollers 39a and 40a engage two parallel guide rails 41, one secured to each of the vertical channels 35 centrally thereof as clearly seen in FIG. 1. Each of these guide rails extends from the top cap 36 downwardly to a point indicated at 41a.

Referring now to FIGS. 4 and 5, the details of the ram carriage will be described. The ram 42 is a heavy member having a horizontal portion 42a and a central upstanding flange portion 42b. This ram is firmly fixed at each end between two parallel drive plates 43, each pair of such plates being secured together by an intermediate spacer 44. At their lower ends, each pair of plates 43 are connected together by a pair of parallel cross driver plates 45. Rigidly connected between the plates 45 are two spaced unlocking spool brackets 46 rigidly connected to the plates 45. Centrally of the plates 45, they are provided with a suitable pin 47 for securing the upper end of a ram drive connecting rod 48 which provides the vertical reciprocation for the ram and stripper carriages. It will be noted in FIG. 5 that the guide rollers 39a have suitable spacers to position the rollers centrally between plates 43. Recesses 49 and 50 are provided in the side plates 43 to accommodate the guide rollers 40a of the stripper carriage when the two carriages are assembled. Bumpers 51 are provided on the upper side of recesses 49 to limit the upward movement of the stripper carriage. Bumpers 52 are provided at the lower sides of the recesses 49 to engage the upper guide rollers 40a of the stripper carriage to lift the stripper carriage upon upward movement of the ram carriage.

Means is provided for attaching a plurality of tenderizing blades or knives to the underside of the ram 42. In one embodiment, 609 of such blades or knives, as shown in FIG. 16, are force fitted into parallel vertically extending receiving openings in a block, not shown, but indicated in dot-dash lines at 53 in FIG. 3. Such a block is received in a notched opening 54 in the ram as shown in FIG. 5 and a clamping bar 55 is secured against the opposite side of the block by means of a plurality of wing nuts 56.

The stripper carriage, shown separately in FIGS. 6 and 7, comprises a pair of parallel vertical plates 57 at each side, these plates being secured at each side at the top by the spacer means 58 for the upper guide roller 40a, and at the bottom by the spacer structure 59 for the bottom guide roller 40a. Near the bottom, they are secured by rigidly attached cross angles 60, between which are bolted, at spaced points, two stripper lock assemblies 61 presently to be described. Across the top of the stripper carriage is secured a stripper plate 62 which comprises a rectangular metal frame 62a, centrally of which is mounted a perforated member 62b which in one embodiment is made of Nylon having a plurality of through perforations 62c, each of which is positioned directly below one of the blades or knives of FIG. 16 so that when these blades come down through the meat they are accommodated each one by a perforation 62c. At the lower ends of the vertical plates 57 there are provided, at each side, a pair of stop bumpers 63, adapted to stop the downward travel of the stripper carriage when it strikes the stop blocks 64, best seen in FIG. 1, These stop blocks are fastened to the vertical channels 35.

Means is provided for locking the stripper plate 62 relative to the frame of the machine while the tenderizing blades are withdrawn upwardly out of the meat. This consists of two stripper lock assemblies already indicated at 61 in FIGS. 6 and 7. Referring to FIGS. 11, 12 and 13, each stripper lock assembly comprises a frame 65, in which two locking pawls 66 are pivotally mounted about pins 67 which pass into and are held in opposite sides of the frame. The free inner ends of the pawls are provided with arcuate locking recesses 68 which in the closed position of the pawls shown in FIG. 11 encompass a circular periphery adapted to lock tightly upon either of two locking rods 69 clearly seen in FIGS. 1, 2, 3, 4 and 6. Each of these locking rods is mounted in a bracket 70, each of which is pivoted at one end in the frame spacer bar 25 and in a power mount support 71 at the opposite end. Each of these locking rods passes upwardly through an unlocking spool bracket 46 and through an unlocking spool 72, freely slidable on the locking rod, and then through the associated locking assembly 61 and upwardly therebeyond. Each of the pawls 66 is normally urged to its locking position shown in FIG. 11 by a leaf spring 73, each of which has its outer end fixed to the frame 65 by a spring clip 74 held in position by a stud bolt 75. Openings 65a are for bolting the frames 65 to the cross angles 60. The locking pawls are moved to an unlocking position as shown in FIG. 13 when the unlocking spools 72 are lifted upwardly by upward movement of the brackets 46 as the ram carriage lifts the tenderizing blades out of the meat. At this time the upper end of each locking spool enters into the associated recesses 76 on the undersides of the locking pawls, thus lifting them upwardly against the urging of the springs 73. During such lifting of the locking pawls, they are held in proper alignment by two dowel pins 77, each of which is shown fixed in the left-hand portion 66a of FIG. 13 and remains in engagement with a dowel pin receiving recess 78 in the right-hand pawl portion 66b as seen in FIG. 13.

Means is provided for causing chunks of meat to travel intermittently along the upper run of the conveyor belt 33 in the direction of the arrow of FIG. 1 when the tenderizing blades are in their uppermost position. Referring to the right-hand side of FIG. 1, and to FIG. 14, a rotatable crank 79 is connected by a drive link 80 with the free end of a drive lever 81 which is freely rotatable on a drive shaft 82. This shaft is rotatably mounted in parallel brackets 83 which extend downwardly from and are supported by the conveyor support member 27. The lever 81 carries a pin 84 adapted to drivingly engage a pin 85 on a clutch drive ring 86. This ring has a center opening 86a which is keyed to a radially outer drive member of a unidirectional clutch 87. This clutch has a radially innermost member which is secured to shaft 82. This clutch is so arranged that, as viewed in FIG. 1, the driving action only occurs when drive lever 81 moves in a counterclockwise direction. This unidirectional clutch is Formsprag No. FS–05 sold by The Heim Company of Fairfield, Connecticut. It is believed that further description of this clutch is unnecessary here as it forms no part of the present invention. The idle movement of the clutch drive ring 86 is caused by clockwise movement of the drive lever 81 as viewed in FIG. 1. This is controlled by a feed adjustment disk or cam 88 pivotally mounted about a pin 89 fixed on the ring 86. This adjustment is controlled by a knob 90 affixed to the end of pin 89. In the embodiment shown, three possible positions are indicated respectively in full line, dot-dash lines and dot-dot-dash lines in FIG. 15. A spring pressed detent 91 is fixed in ring 86 and drops into an appropriate recess in the feed adjustment disk 88 in each of the three positions shown. Referring to FIGS. 1, 14 and 15, it will be seen that movement of the pin 84 on lever 81 in a clockwise direction as shown in FIG. 1, which would be counterclockwise of ring 86 in FIG. 15, will strike the disk 88 either at point A, B or C depending upon the position of disk 88. If this occurs at point A, then obviously the drive ring 88 will be moved through a greater arc than if the engagement occurs at point B or C. Then, the following drive stroke of lever 81 will cause pin 84 of lever 81 to engage pin 85 of ring 86 to turn the drive ring 86 clockwise in FIG. 15 the predetermined amount which will drive the conveyor a predetermined distance as hereinafter explained. At one end of shaft 82 there is mounted a drive sprocket 92. This is connected by a drive chain 93 which drives sprocket 94 which is mounted on one end of shaft 29 which as previously described causes driving movement of the conveyor belt engaging sprockets 30. A spring pressed idler 95 provides take-up for the drive chain 93.

A common drive means is provided for causing the heretofore described movements of the ram 42 and the conveyor belt 33. This power means comprises a motor 96 mounted on a base 97 which in turn is supported on the power mount 71 and another mounting member 98. The motor drives a sheave 99 which is connected by drive belt 100 to a sheave 101 in a power reduction gearing 102 also mounted on the base 97. The output shaft of the reduction gearing at 103 is fitted with a drive sprocket 104 which is connected by a drive chain 105 with a drive sprocket 106 which, in turn, is fixed to the main drive shaft 107. An idler 108 carried on an L-shape bracket 109 pivoted to the frame at 110 is held by a threaded adjustment pin 111 against the drive chain 105.

It will be seen in FIG. 1 that the main drive shaft 107 drives a rotatable member 112 at the right-hand end of FIG. 1 which carries the crank arm 79 which was previously mentioned and which controls the conveyor belt drive. This same main drive shaft at the left-hand end as seen in FIG. 1 is provided with a crank arm 113 which carries a crank pin 114 which is drivingly connected with the lower end of connecting rod 48, the upper end of which is connected to the ram carriage at pin 47 as previously described. The arrangement of the parts is such that the intermittent movement of the upper run of conveyor 33 occurs while the crank pin 114 is undergoing the upper portion of its travel and the block of tenderizing blades 53 is well above the chunks of meat on the conveyor 33.

An anvil 115 is provided beneath the upper run of conveyor belt 33 at the zone where the tenderizing blades come down through the meat. Such an anvil is shown in FIG. 1 and shown separately in FIG. 9 and 10. An anvil support 116 is secured to the frame and holds the anvil firmly in position so that the meat will be firmly supported beneath the downward thrust of the tenderizing blades, which do not quite touch the conveyor belt 33.

A pair of product guide plates 117 are provided on opposite sides of the conveyor belt 33 as the meat approaches the tenderizing zone. These product guides at each side of the belt insure that the chunks of meat are properly positioned between the block of tenderizing blades 53.

Four safety guards 118 are provided, a pair on each side of the conveyor belt with one guard on each side of the vertical frame 34.

A product height limit bar 119 is supported from the frame of the machine on two vertical brackets 120 in a position to engage oversize chunks of meat as they approach the tenderizing zone traveling on the conveyor belt 33. This insures that excessively thick chunks of meat will not be presented to the tenderizing knives.

A drip pan 121 is shown in dot-dash lines in FIG. 3. This is to catch meat juices dripping through the conveyor belt and drain the same to the side, after which they are led to one end of the machine to drip into a container.

Guards are provided around all of the machinery within the main frame beneath the conveyor belt but details of this sort having nothing to do with the present invention.

A source of power for the motor 96, and controls therefor are provided but these are all of a standard nature.

The operation of the machine should now be apparent. Power is supplied to motor 96 which will cause rotation of the main drive shaft 107 together with rotational movement of the crank 79 for driving the conveyor belt and of the crank arm 113 for driving the ram carriage. Each downward movement of the link 80 causes clockwise movement of the drive lever 81 as shown in FIG. 1. This causes an idle stroke of the clutch drive ring 86, the amount of which depends upon the position of the feed adjustment disk or cam 88. At each upward stroke of the link 80, the drive lever 81 moves in a counterclockwise direction as viewed in FIG. 1 and this is an active drive movement through the one-way clutch 87, which motion is transmitted through the chain drive 93 to the drive sprocket 94 causing movement of the conveyor 33 a predetermined amount. In one embodiment of the invention, this increment of movement of the meat along the belt 33 may be varied between 3 inches, 1½ inches and 1 inch, depending on the positions A, B and C of the feed adjustment disk 88 as shown in FIG. 15. These increments are respectively one full width of the blade block 33, lengthwise of the machine, one-half of that width, and one-third of that width so that the meat may be penetrated one, two or three times, as desired. This increment of movement may be varied while the machine is running by a simple adjustment of the control knob 90.

The action of the ram and stripper carriages is as follows. While the meat is moving into the tenderizing zone on the conveyor belt 33, the ram carriage is in the uppermost position as indicated in FIG. 1. In moving to this upper position, the bumpers 52 on the ram carriage have lifted the stripper carriage upwardly by engagement of the upper guide rollers 40a. When these upper guide rollers engage bumpers 51, the blades 53' have just about cleared the stripper frame 62, and spools 72 release the locking pawls 66 as shown in FIG. 13. Further rotation of shaft 107 causes rotation of the crank arm 113 which by means of pin 114 carries the connecting rod 48 downwardly which is connected with pin 47 to move the ram carriage downwardly. At this time, the stripper carriage moves along downwardly freely impelled by gravity until the stripper plate comes to rest on top of the meat. At this point, as ram carriage continues downwardly, the unlocking spools 72, sliding on the guide rods 69, are carried downwardly by downward movement of the unlocking spool brackets 46 on the ram carriage. The locking pawls 66 up to this time have been in the unlocked position of FIG. 13. As the unlocking spools 72 travel downwardly, the leaf springs 73 of FIGS. 11, 12 and 13 cause the pawls 66 to move to the locking position of FIG. 11. The stripper plate 62 then stays in a locked position relative to the frame of the machine until the ram carriage has caused the tenderizing blades 53' to pass downwardly almost, but not quite, through the meat and back upwardly on the return stroke until the blades are pulled out of the meat, and almost out of the stripper frame 62, on the upstroke. At this time the crank pin 114 is again moving upwardly. As the tenderizing blades 53' are lifted upwardly out of the meat, the brackets 46 on the ram carriage lift the unlocking spools 72 to engage the recesses 76 in the pawls 66 thus moving the pawls to the unlocking position of FIGS. 12 and 13. Thus, the locking pawls have performed their function of holding the stripper plate firmly in position on top of the meat until the tenderizing blades have been withdrawn from the meat. The ram carriage and stripper carriage again move freely to the uppermost position.

What is claimed is:

1. In a meat tenderizer, a main frame, a conveyor on said frame having a generally horizontal run for moving said meat, a ram carriage, means mounted on said frame operatively associated with said carriage for guiding the latter for vertical reciprocation toward and away from said conveyor run, downwardly directed meat tenderizing blades, means at the upper end of said ram carriage for mounting said downwardly directed meat tenderizing blades, means for moving said conveyor to carry a piece of meat on said run thereof to a position beneath said ram carriage, and anvil beneath said conveyor at said position to support said meat for penetration of said blades, means effective when a piece of meat is in said position to move said ram carriage downward and to cause said blades to pierce downwardly through said meat, said last named means being effective thereafter to move said ram carriage upward and to withdraw said blades above said meat, a stripper carriage constructed and arranged to move downwardly and upwardly in coordination with like movements of said ram carriage and in the same zone of movement, a stripper frame on said stripper carriage and arranged to provide clear passage of said blades through it, said stripper frame being positioned to rest upon the upper surface of a piece of meat being pierced by said blades, means for locking said stripper plate relative to said main frame as said blades are withdrawn upwardly by said ram carriage and for releasing said locking means when said blades are clear of said meat, and means timing said conveyor moving means for advancing a piece of meat on said horizontal run thereof a predetermined distance only when said blades are raised to a position clear of said meat by said ram carriage, said timing means comprising a single drive shaft having two driven cranks connected respectively with said ram carriage and with said conveyor moving means.

2. In a meat tenderizer, a main frame, a conveyor on said frame having a generally horizontal run for moving said meat, a ram carriage, means mounted on said frame operatively associated with said carriage for guiding the latter for vertical reciprocation toward and away from said conveyor run, downwardly directed meat tenderizing blades, means at the upper end of said ram carriage for mounting said downwardly directed meat tenderizing blades, means for moving said conveyor to carry a piece of meat on said run thereof to a position beneath said ram carriage, an anvil beneath said conveyor at said position to support said meat for penetration of said blades, means effective when a piece of meat is in said position to move said ram carriage downward and to cause said blades to pierce downwardly through said meat, said last named means being effective thereafter to move said ram carriage upward and to withdraw said blades above said meat, a stripper carriage constructed and arranged to move downwardly and upwardly in coordination with like movements of said ram carriage and in the same zone of movement, a stripper frame on said stripper carriage and arranged to provide clear passage of said blades through it, said stripper frame being positioned to rest upon the upper surface of a piece of meat being pierced by said blades, mean for locking said stripper plate relative to said main frame as said blades are withdrawn upwardly by said ram carriage and for releasing said locking mean when said blades are clear of said meat, two vertically extending guide rails rigidly connected with said main frame, one on each side of said conveyor, guide rail followers on said ram carriage and on said stripper carriage operatively coacting with said guide rails during vertical reciprocation of said carriages, and said carriages being so constructed and arranged as to provide limited relative vertical movement between them.

3. In a meat tenderizer a main frame, a conveyor on said frame having a generally horizontal run for moving said meat, a ram carriage, means mounted on said frame operatively associated with said carriage for guiding the latter for vertical reciprocation toward and away from said conveyor run, downwardly directed meat tenderizing blades, means at the upper end of said ram carriage for mounting said downwardly directed meat tenderizing blades, mean for moving said conveyor to carry a piece of meat on said run thereof to a position beneath said ram carriage, an anvil beneath said conveyor at said position to support said meat for penetration of said blades, means effective when a piece of meat is in said position to move said ram carriage downward and to cause said blades to pierce downwardly through said meat, said last named means being effective thereafter to move said ram carriage upward and to withdraw said blades above said meat, a stripper carriage constructed and arranged to move downwardly and upwardly in coordination with like movements of said ram carriage and in the same zone of movement, a stripper frame on said stripper carriage and arranged to provide clear passage of said blades through it, said stripper frame being positioned to rest upon the upper surface of a piece of meat being pierced by said blades, means for locking said stripper plate relative to said main frame as said blades are withdrawn upwardly by said ram carriage and for releasing said locking means when said blades are clear of said meat, said stripper plate locking means comprising locking pawl mean rigidly connected with said stripper carriage, vertically extending lock rod mean fixed relative to said frame and ectending the zone of said stripper carriage, said lock rod means positioned for engagement by said locking pawl means, spring means normally urging said pawl means in locking direction toward said said lock rod means, and means carried by said ram carriage for unlocking said pawl means when said ram carriage carries said blades out of said meat.

4. A meat tenderizer as defined in claim 3 wherein said last named means comprises unlocking spool means slidably mounted on said lock rod means positioned to engage and move said pawl means away from said lock rod means, and said spool means engageable by upward movement of said ram carriage.

5. In a meat tenderizer, a main frame, a conveyor on said frame having a generally horizontal run for moving said meat, a ram carriage, means mounted on said frame operatively associated with said carriage for guiding the latter for vertical reciprocation toward and away from said conveyor run, downwardly directed meat tenderizing blades, means at the upper end of said ram carriage for mounting said downwardly directed meat tenderizing blades, means for moving said conveyor to carry a piece of meat on said run thereof to a position beneath said ram carriage, an anvil beneath said conveyor at said position to support said meat for penetration of said blades, means effective when a piece of meat is in said position to move said ram carriage downward and to cause said blades to pierce downwardly through said meat, said last named means being effective thereafter to move said ram carriage upward and to withdraw said blades above said meat, a stripper carriage constructed and arranged to move downwardly and upwardly in coordination with like movements of said ram carriage and in the same zone of movement, a stripper frame on said stripper carriage and arranged to provide clear passage of said blades through it, said stripper frame being positioned to rest upon the upper surface of a piece of meat being pierced by said blades, means for locking said stripper plate relative to said main frame as said blades are withdrawn upwardly by said ram carriage and for releasing said locking means when said blades are clear of said meat, said conveyor belt moving means comprising a conveyor drive sprocket drivingly connected with said conveyor, a conveyor advancing shaft drivingly connected with said drive sprocket, a one-way clutch having a driven member rigid with said shaft, a clutch drive ring, said clutch having a driving member rigidly connected with said clutch drive ring, said conveyor moving means including an oscillatable crank operatively connected with a link which in turn is operatively connected with one end of an oscillatable clutch drive lever, said lever having its other end oscillatably pivoted on said shaft, said lever and said clutch drive ring having projections mutually in driving engagement for moving said clutch driven member in conveyor-advancing direction upon oscillation of said lever in one direction, and a feed adjusting member on said ring and engageable by said lever to move said clutch drive ring on an idle stroke of said clutch driving member upon oscillation of said lever in the other direction.

6. A meat tenderizer as defined in claim 5 including mean for varying the position of said feed adjusting member relative to said ring.

7. A meat tenderizer as defined in claim 6 wherein said last named means includes a disk cam oscillatably mounted on said ring, said cam having detent mean for holding the same in various positions wherein said cam edges engage said lever in different of its arcuate positions relative to said clutch drive ring, and a knob operatively connected with said disk cam for varying its position relative to said drive ring while said conveyor is being driven.

8. In a meat tenderizer, a main frame, a conveyor on said frame having a generally horizontal run for moving said meat, a ram carriage, mean mounted on said frame operatively associated with said carriage for guiding the latter for vertical reciprocation toward and away from said conveyor run, downwardly directed meat tenderizing blades, means at the upper end of said ram carriage for mounting said downwardly directed meat tenderizing blades, means for moving said conveyor to carry a piece of meat on said run thereof to a position beneath said ram carriage, an anvil beneath said conveyor at said position to support said meat for penetration of said blades, means effective when a piece of meat is in said position to move said ram carriage downward and to cause said blades to pierce downwardly through said meat, said last named means being effective thereafter to move said ram carriage upward and to withdraw said blades above said meat, a stripper carriage constructed and arranged to move downwardly and upwardly in coordination with like movements of said ram carriage and in the same zone of movement, a stripper frame on said stripper carriage and arranged to provide clear passage of said blades through it, said stripper frame being positioned to rest upon the upper surface of a piece of meat being pierced by said blades, means for locking said stripper plate relative to said main frame as said blades are withdrawn upwardly by said ram carriage and for releasing said locking means when said blades are clear of said meat, said ram carriage and said stripper carriage being interfitted for vertical reciprocation in a common zone, a lost motion connection between said carriages permitting said ram carriage to drive said blades downwardly into said meat after said stripper is stopped by engagement with the top of said meat, and abutment means on said ram carriage engageable with said stripper carriage to lift the latter just as said blades substantially clear said meat simultaneously with said release of said locking means.

* * * * *